United States Patent [19]

Lotan et al.

[11] 3,848,233

[45] Nov. 12, 1974

[54] METHOD AND APPARATUS FOR INTERFACING WITH A CENTRAL PROCESSING UNIT

[75] Inventors: Amram Zvi Lotan, Holon, Israel; Dixson Teh-Chao Jen, Monore, Conn.

[73] Assignee: Bunker Ramo Corporation, Oak Brook, Ill.

[22] Filed: Nov. 1, 1971

[21] Appl. No.: 194,677

[52] U.S. Cl. .......... 340/172.5
[51] Int. Cl. .......... G03f 3/04
[58] Field of Search .......... 340/172.5

[56] References Cited

UNITED STATES PATENTS

| | | | |
|---|---|---|---|
| 3,331,055 | 7/1967 | Betz et al. | 340/172.5 |
| 3,395,394 | 7/1968 | Cottrell, Jr. | 340/172.5 |
| 3,396,372 | 8/1968 | Calvert | 340/172.5 |
| 3,399,384 | 8/1968 | Crockett et al. | 340/172.5 |
| 3,449,722 | 6/1969 | Tucker | 340/172.5 |
| 3,453,600 | 7/1969 | Stafford et al. | 340/172.5 |
| 3,456,244 | 7/1969 | Seichter et al. | 340/172.5 |
| 3,534,339 | 10/1970 | Rosenblatt | 340/172.5 |
| 3,553,656 | 1/1971 | Bernhardt | 340/172.5 |
| 3,599,162 | 8/1971 | Byrns et al. | 340/172.5 |
| 3,665,415 | 5/1972 | Beard et al. | 340/172.5 |

*Primary Examiner*—Gareth D. Shaw
*Assistant Examiner*—Melvin B. Chapnick
*Attorney, Agent, or Firm*—F. M. Arbuckle; R. J. Kransdorf

[57] ABSTRACT

An interface unit for controlling the transfer of information between a plurality of data bearing lines, at least some of which are fed by input/output devices, and a central processing unit. Since information may be received at at least two different priority levels, the unit includes a means for detecting the priority level of received information. When the unit receives information, it stores the information in an addressable buffer memory in an area allocated to the particular priority level and informs the CPU that information at the priority level is available. The address at which the information is stored is determined from an input address memory which stores the address at which the next item of information at each priority level is to be placed. The CPU then interrogates the unit causing information to be transferred from the buffer memory to the CPU under control of an output address memory which contains the address in the buffer for each priority level of the next item to be transferred to the CPU. An output buffer memory is also provided in the unit. When the CPU indicates that it has data to transmit, data is loaded into this memory in a position corresponding to the intended device a character at a time. Each time the unit is ready for another character from the CPU, the CPU is informed of this fact.

19 Claims, 13 Drawing Figures

Fig. 3

CONTROL MEMORY
COM

| BIT NO. | |
|---|---|
| 1 | CADM CONTAINS DATA TO BE TRANSMITTED |
| 2 | ODBM CONTAINS DATA TO BE TRANSMITTED |
| 3 | I/O IS IN TRANSMIT MODE |
| 4 | a: I/O COMMAND TO TURN ON REQUEST TO SEND (CLEAR TO SEND=0)<br>b: A NEW CHARACTER HAS BEEN REQUESTED FROM CPU (CLEAR TO SEND=1) |
| 5 | 1ST SYNCH. CHARACTER HAS BEEN RECEIVED |
| 6 | 2ND SYNCH. CHARACTER HAS BEEN RECEIVED |
| 7 | ACTIVE OR PASSIVE MODE CONTROL 0: ACTIVE MODE<br>1: PASSIVE MODE |
| 8 | CLOCK COMPARE BIT (FOR ASYNCHRONOUS TRANSMISSION AND RECEPTION) |
| 9 | MID BIT DETECTOR (FOR ASYNCHRONOUS TRANSMISSION AND RECEPTION)<br>MBD |
| 10 | |
| 11 | |
| 12 | DATA IS RECEIVED (IN ASYNCHRONOUS RECEPTION) |

METHOD AND APPARATUS FOR INTERFACING WITH A CENTRAL PROCESSING UNIT

This invention relates to a method and apparatus for controlling the transfer of information between a plurality of data-bearing lines and a central processing unit and more particularly to a unit for effecting such transfers where the data being transmitted may have various priority levels.

The central processing unit (CPU) of most data processing systems is capable of performing only a single function at a time. Thus, when the CPU is receiving information from a piece of peripheral equipment or over a transmission line from another CPU, or when the CPU is generating information for one of these devices, the performance of other operations by the CPU must be interrupted. The duration of the interrupt must be long enough to permit the CPU to receive or transmit the required data. However, the speed of the CPU is generally many times greater than that of the lines and devices feeding into it. Thus, some sort of an input/output interfacing device is required in order to minimize the amount of CPU time required to service the various data transmission operations.

In order to minimize the cost of an I/O interfacing device, the amount of hardware per I/O device or line contained in the interface should be minimized. However, the interface must still be capable of operating with a great variety of I/O devices having variable speeds, priority requirements, clocking schemes, and other interface requirements. The interface should thus be versatile enough to handle various I/O equipment which it is known that the CPU will interface with as well as to handle possible additional devices which it may be called upon to handle in the future without requiring substantial hardware changes in the interface itself. To some extent, this versatility may be achieved by permitting much of the interface operation to be controlled programmatically from the CPU. However, the actual CPU time required for servicing the interface should be minimized.

It is therefore a primary object of this invention to provide an improved input/output interface unit for a CPU.

A more specific object of this invention is to provide an I/O interface unit which permits great versatility in the nature of equipment which may be serviced thereby with little if any hardware changes being required in the interface hardware to accommodate a new type of I/O device.

Another object of this invention is to provide an interface unit of the type indicated above which requires a minimum amount of CPU time.

A further object of this invention is to provide an interface unit of the type indicated above which is capable of handling priority assignment allocations for the various devices serviced thereby.

In accordance with these objects, this invention provides an interface unit for controlling the transfer of information between a plurality of data-bearing lines, at least some of which are fed by input/output devices, to a central processing unit. The received information has at least two different priority levels. The unit includes a means for detecting the priority level of each item of information applied to the system and a means responsive to the detecting means for informing the CPU of the availability of information at the detected priority level. An addressable memory is also provided, the memory having an area allocated to each priority level. The unit also has an input means for indicating the address in the memory at which the next item of information at each of the priority levels is to be stored and an output means for indicating the address in the memory at which is stored the next item of information at each priority level to be transferred to the CPU. Each applied item of information is stored in the memory under control of the priority detecting means and the input address indicating means. Each item of information is transferred from the memory means to the CPU under control of the CPU informing means and the output address indicating means. The input address indicating means and the output address indicating means are each incremented for the appropriate priority levels when they are utilized and the unit includes a means operative after an information transfer to the CPU for comparing the addresses indicated by the input and output indicating means. The informing means for the detected priority level is reset when the comparator addresses are equal.

An output buffer memory is also provided in said unit. When the CPU indicates that it has data to transmit, data is loaded into this memory in a position corresponding to the intended device a character at a time. Each time the interface is ready for another character from the CPU, the CPU is informed of this fact thus freeing the CPU from continuously having to monitor the transmit operation.

The foregoing and other objects, features and advantages of the invention will be apparent from the following more particular description of a preferred embodiment of the invention as illustrated in the accompanying drawings.

BRIEF DESCRIPTION OF DRAWINGS

FIG. 3 is a chart illustrating the contents of the control memory shown in FIG. 2B.

GENERAL SYSTEM DESCRIPTION

Figure 1:
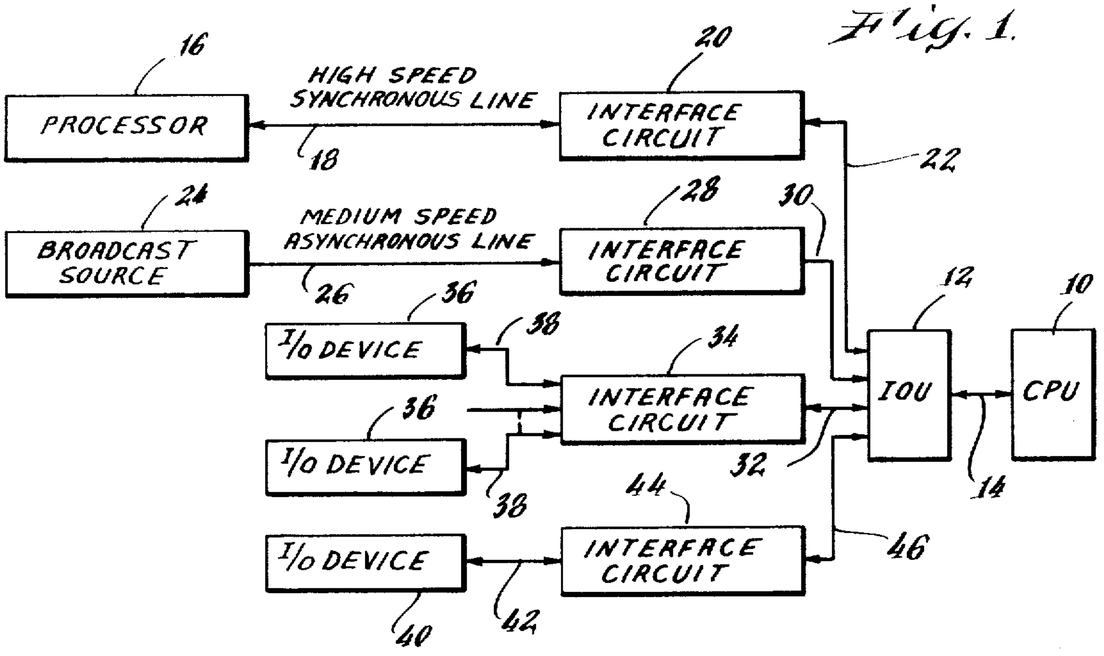
FIG. 1 is a schematic block diagram of a computer system in which the invention is utilized.

Referring to FIG. 1, it is seen that a central processing unit (CPU) 10 is connected to an input-output control unit (IOU) 12 through lines 14. As will be seen later, data, addresses, or commands may pass over the lines 14. Since the quantity and type of devices interfacing CPU 10 through IOU 12 will vary with each application, the configuration shown in FIG. 1 merely illustrates the various types of inputs. Thus, another processor 16 which may itself have an IOU and modems or other interface circuits is connected through a high speed synchronous line 18, a suitable interface circuit 20 which may again be a modem or other special circuitry to be described briefly later, and a line 22 to one input or port of IOU 12. Since information may pass from processor 16 to CPU 10 or from CPU 10 to processor 16, lines 18 and 22 are both bidirectional lines. A broadcast source 24 may send data through a medium speed asynchronous line 26, a suitable interface circuit 28, and a line 30 to another port of IOU 12. Broadcast source 24 may, for example, be a newswire or, in stock market applications, a ticker source. Since broadcast source 24 does not receive information from CPU 10, unidirectional lines may be utilized for the lines 26 and 30. The interface circuit 28 may be a standard modem. A portion of the interface circuitry utilized with a bidirectional asynchronous line will be described later. A third port of IOU 12 may be connected through bidirectional lines 32 to an interface circuit 34 which is in turn fed by a plurality of I/O devices 36 over bidirectional lines 38. The devices 36 would normally be low speed devices such as keyboards, the scanning of which may be multiplexed without the loss of information. A higher speed I/O device 40 is connected through a line 42, an interface circuit 44, and line 46 to a separate port of I/O device 12. Lines 42 and 46 are bidirectional and line 42 may be either synchronous or asynchronous depending on its speed and other considerations.

GENERAL DESCRIPTION OF PREFERRED EMBODIMENT OF THE INVENTION

Figures 2, 2A:
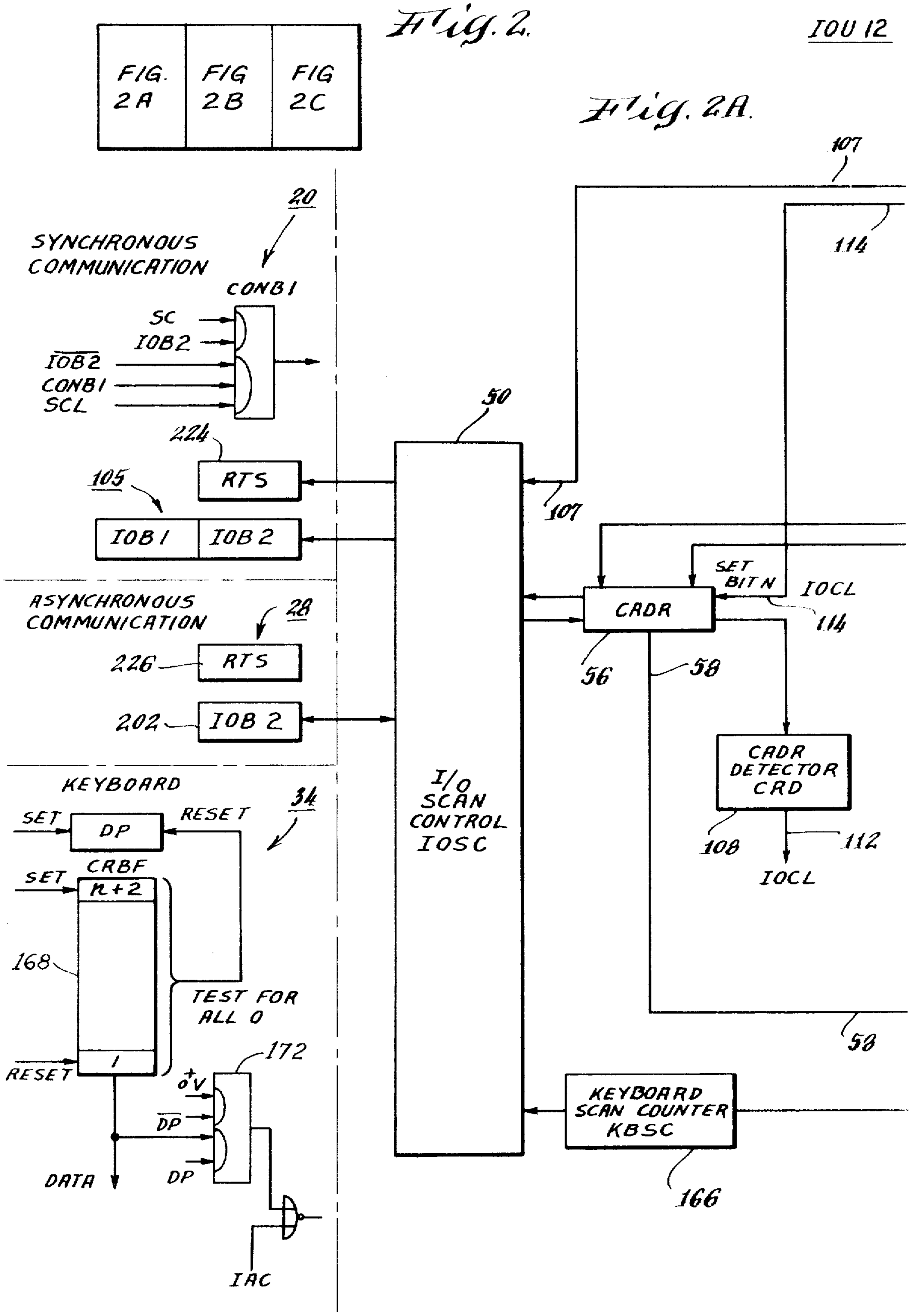
FIGS. 2A – 2C, when combined as shown in FIG. 2, form a schematic block diagram of a preferred embodiment of the invention.
Figure 2B:
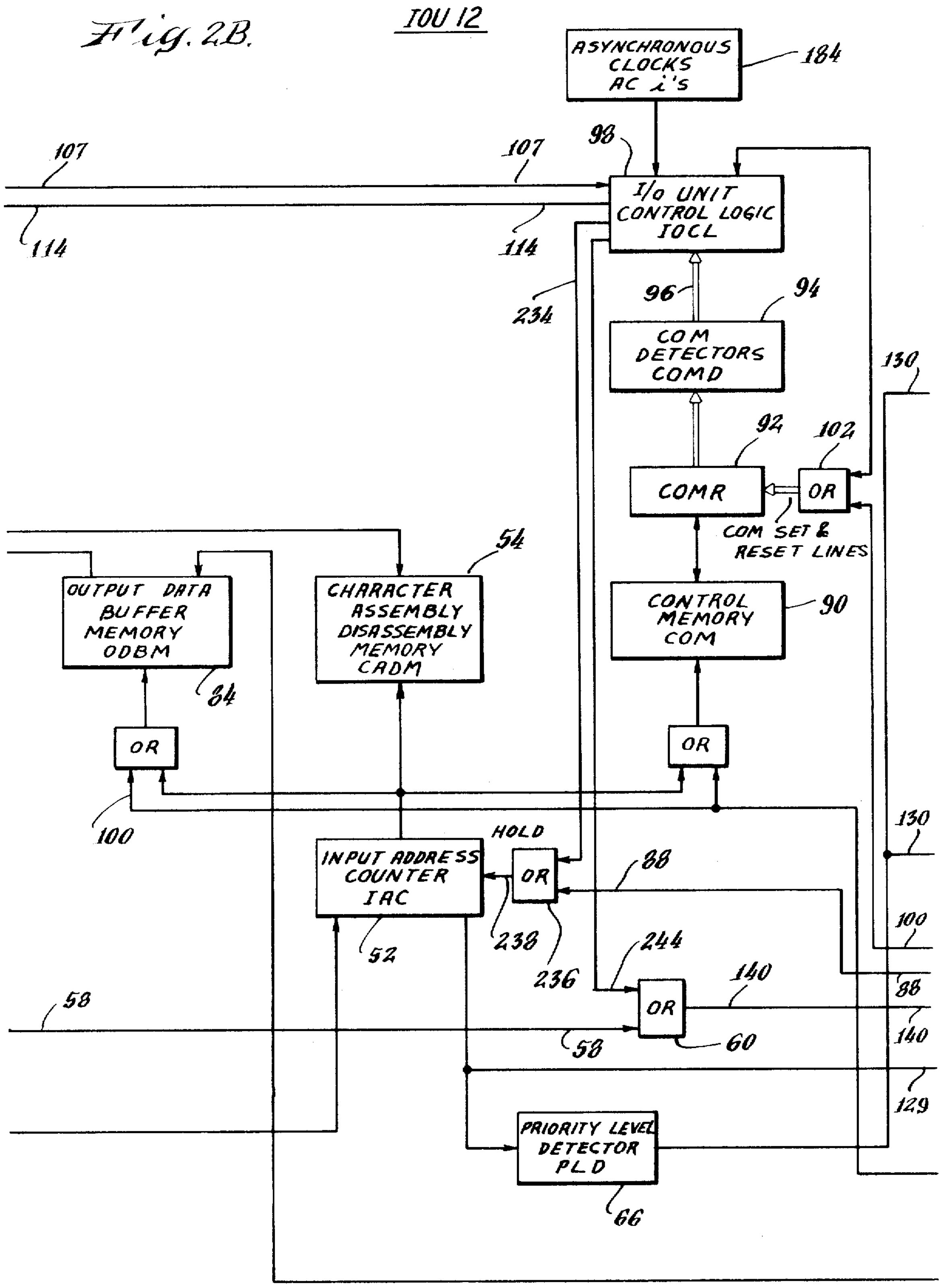
Figure 2C:
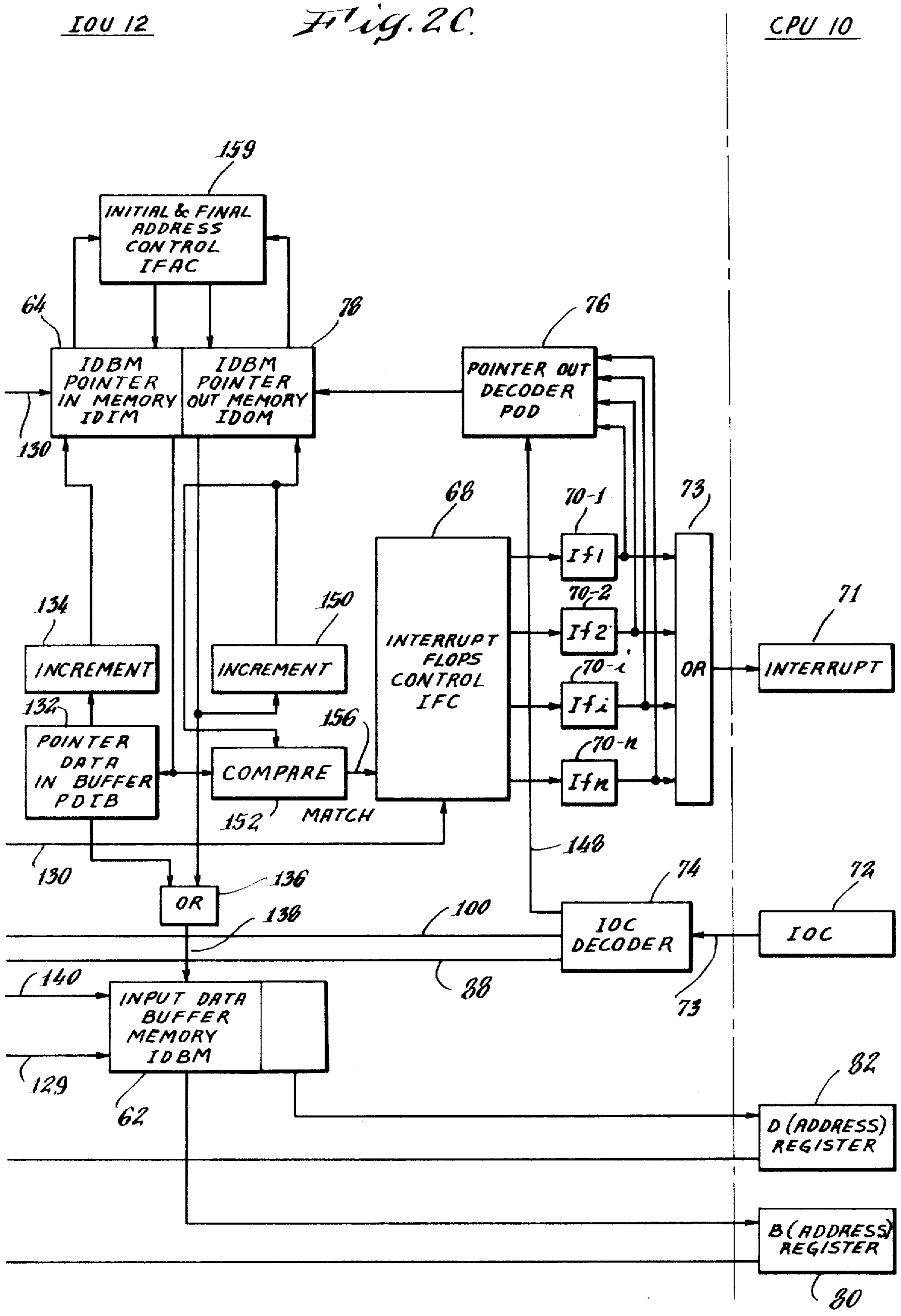

Referring now to FIGS. 2A – 2C, a block diagram of IOU 12 is provided along with certain elements of CPU 10 and interface circuits such as 20, 28 and 34. Briefly, a character of information to be received by CPU 10 is applied to the system a bit at a time. Input-output scan control (IOSC) circuit 50 (FIG. 2A) selects the line being monitored by the IOU at any given time. An input address counter (IAC) 52 (FIG. 2B) controls the line selected by IOSC 50. Counter 52 is normally being incremented at a rate many times greater than the rate at which the fastest device being monitored applies bits to the IOU. Thus, each received bit is scanned many times. For each address indicated by IAC 52, there is a memory position in character assembly disassembly memory (CADM) 54. Each time IAC 52 changes address, the memory position in CADM corresponding to the new address is read out into character assembly disassembly register (CADR) 56 (FIG. 2A) (conditions under which this read out does not occur will be mentioned later). If the line being monitored has a bit to be applied to the IOU, this bit is shifted into CADR 56. Before IAC 52 is again incremented, the new word now stored in CADR, or the original word if there is no change, is read back into the appropriate memory position in CADM 54.

The above sequence of operations is repeated with a new bit being shifted into CADR each time it appears on the monitored line until an indication is received that a full character has been loaded into CADM for a particular line. At a subsequent time, when the contents of CADM are read out into CADR, the assembled character is passed through lines 58 and OR gate 60 to be stored in input data buffer memory (IDBM) 62 (FIG. 2C). The address in IDBM 62 at which a given input is stored is obtained from IDBM pointer in memory (IDIM) 64. IDBM 62 is divided into separate areas, one for each input priority level of the system. IDIM 64 indicates the address in IDBM 62 at which the next input character for each priority level is to be stored. Each address indicated by IAC 52 has a priority level which is detected by priority level detector (PLD) 66 (FIG. 2B). The detected level is utilized to read out the input address from IDIM 64. The character from CADR 56 is stored in memory 62 at the read out address. The device address in IAC 52 is also stored with the character in memory 62.

In addition to causing the read out of IDIM 64, the priority level indication detected by PLD 66 also causes interrupt flops control (IFC) 68 to set the interrupt flip-flop (IFi) 70 for the detected priority level. The contents of flip-flops 70 are sent to interrupt register 71 of the CPU through OR gate 73. The next time that the CPU 10 tests interrupt register 71, it will find that one or more of the flip-flops 70 is set. In response to this detection, the CPU generates an internal interrupt and applies an input-output command (IOC) through register 72 to the IOU. This command is decoded in IOC decoder 74 and causes pointer out decoder (POD) 76 to generate a read out command from both IDIM 64 and IDBM pointer out memory (IDOM) 78. IDOM 78 contains the address in IDBM 62 for each priority level at which the next character to be read out into the CPU from that priority level is stored. The reading out of IDOM thus causes the oldest character in IDBM for the given priority level to be read out into the B (data) register 80 of CPU 10. The address stored with the character is read into the D (address) register 82 of the CPU.

The address read out from IDOM is then incremented and compared against the address read out from IDIM. If these two addresses are the same, then all characters for the given priority level have been read out from IDBM and the interrupt flip-flop 70 for the priority level is reset. If these addresses do not compare, then the next time the CPU tests interrupt, it will still find the interrupt flop set and the next character for the given priority level will be read out into the B and D registers of the CPU in the manner indicated above.

When the CPU has a character to transmit through one of the lines, it will set the IOU to transmit mode for the given line in a manner to be described later, will store the character to be transmitted in the B register 80 and will store the address to which the character is to be transmitted in the D register 82. The IOU has an output data buffer memory (ODBM) 84 (FIG. 2B) which has a character position corresponding to each of the lines addressed by IAC 52. When the position for the address indicated in D register 82 is empty, the IOU will load a message into the appropriate priority position of the IDBM, in a manner to be described later, informing the CPU that the ODBM is available to receive the character in the B memory. The CPU then issues a command to the IOU causing the character to be stored in the ODBM at the address indicated by the D memory. The character in the ODBM is then transferred to the CADR (FIG. 2A), a bit of the device shifted out to the interface for the addressed device, and the contents of CADR shifted back into CADM 54 at the appropriate address position. Each subsequent time that the contents of the CADM are read out into CADR, the IOU tests to see if the interface is ready to receive another bit. When the interface is ready to receive another bit, another bit of the character is shifted out to the interface and the altered contents of CADR reloaded into CADM. In the mean time, the CPU is loading a new character into ODBM 84. When the entire character in CADM has been shifted out, the character now in ODBM 84 is shifted into CADR 56 in the manner previously indicated and the shifting of this character onto the line through the interface begun. This sequence of operation is repeated until an end of message indication is received from the CPU.

It should be noted that while the IOU is transmitting data to one line, it may be receiving data from another line and except for certain instances where the running of IAC 52 (FIG. 2B) is temporarily halted to permit some operation to be performed, the operations with respect to one device in no way interferes with the operations with respect to another device. The IAC is temporarily halted by a signal on line 238 from OR gate 236 when a) the CPU wants control of the IOU as when an IOC is being generated; b) the CPU is loading the ODBM; and c) the CPU is receiving a character from the IDBM. The hold on the IAC is normally in response to an IOC from the CPU on line 88. It should also be noted that the CPU handles interrupts in accordance with their priority level and that information for the appropriate priority level is provided to the CPU without requiring time-consuming searching or processing operations either in the CPU or IOU.

DETAILED DESCRIPTION

In addition to the elements described in the previous section, the IOU also contains a control memory (COM) 90 (FIG. 2B). COM 90 contains a separate 12 bit word for each line addressed by the IAC. FIG. 3 is a table indicating the significance of each bit of a word in the COM. Each time IAC 52 contains the address for a particular line, the control word stored in memory 90 for that line is read out into control memory register (COMR) 92. The contents of this register are detected by COM detectors (COMD) 94 and the output from the detectors 94 are applied through lines 96 to IOU control logic (IOCL) 98. From the control memory word applied to it, and other inputs to be described later, the IOCL determines what, if any functions, are to be performed by the IOU during each time interval that the IAC is addressing a particular line and generates signals to control the various data transfers within the IOU, to alter the control word stored in COMR, or to perform various other functions to be described shortly. In order to simplify the drawings, no attempt will be made to show the details of the IOCL logic. Instead, the functions of this logic will be described in detail, it being understood that the logic for implementing these functions in hardware or software might be easily generated from the following functional description and flow diagrams by one normally skilled in the art. Similarly, gates have not been shown in the various lines inter-connecting the elements, it being understood that IOCL-controlled gates would appear in most of these lines to control the data transfers.

Of the control word bits shown in FIG. 3, bits 3 and 7 are of particular interest at this time. Bit 3 indicates whether the IOU is in transmit or receive mode for the particular line, the IOU being in transmit mode if this bit is set and in received mode if this bit is reset. Bit 7 indicates whether the IOU is in active or passive mode for the particular line during a transmit operation, the IOU being in active mode if this bit is a zero and a passive mode if this bit is a one. The state of both of these bits is controlled by the CPU. To alter the state of one of these bits, the CPU stores the appropriate I/O command in register 72 and the address for the command in D register 82. Decoder 74 decodes the command and applies a signal through an appropriate line 100 and OR gate 102 to alter the appropriate bit in COMR 92. The contents of COMR 92 are then read back into the address position of COM 90 to cause the desired alteration of bit condition.

From the above and the description to follow it can be seen that, for each line, the IOU may be operating in one of four different modes. In the receive passive or idle mode, the IOU is monitoring the line to determine if data is present. It is thus looking for sync characters or for a transition in the state of the line indicating that data is present. In the receive active mode which the device switches to in a manner to be described later when received data is detected, the IOU knows that there is data present and receives everything that comes in on the line. The received data is presented to the CPU.

In the transmit passive mode all data in the CADR and ODBM will be transmitted to the output channel but the IOU will not issue a request for a new character from the CPU when these memories are empty. In the transmit active mode the I/O channel will issue a request for a new character from the CPU every time the ODBM is empty.

RECEIVE MODE

As indicated previously, IOU 12 is capable of transmitting or receiving information on a synchronous line or channel such as line 18, or an asynchronous line or channel such as line 26 and a plurality of I/O devices may be multiplexed to a single channel such as 32–38. As will be seen in the following, the operation of the IOU differs slightly in the transferring of data for the various channels.

RECEIVING DATA FROM A SYNCHRONOUS CHANNEL

Figure 4A:
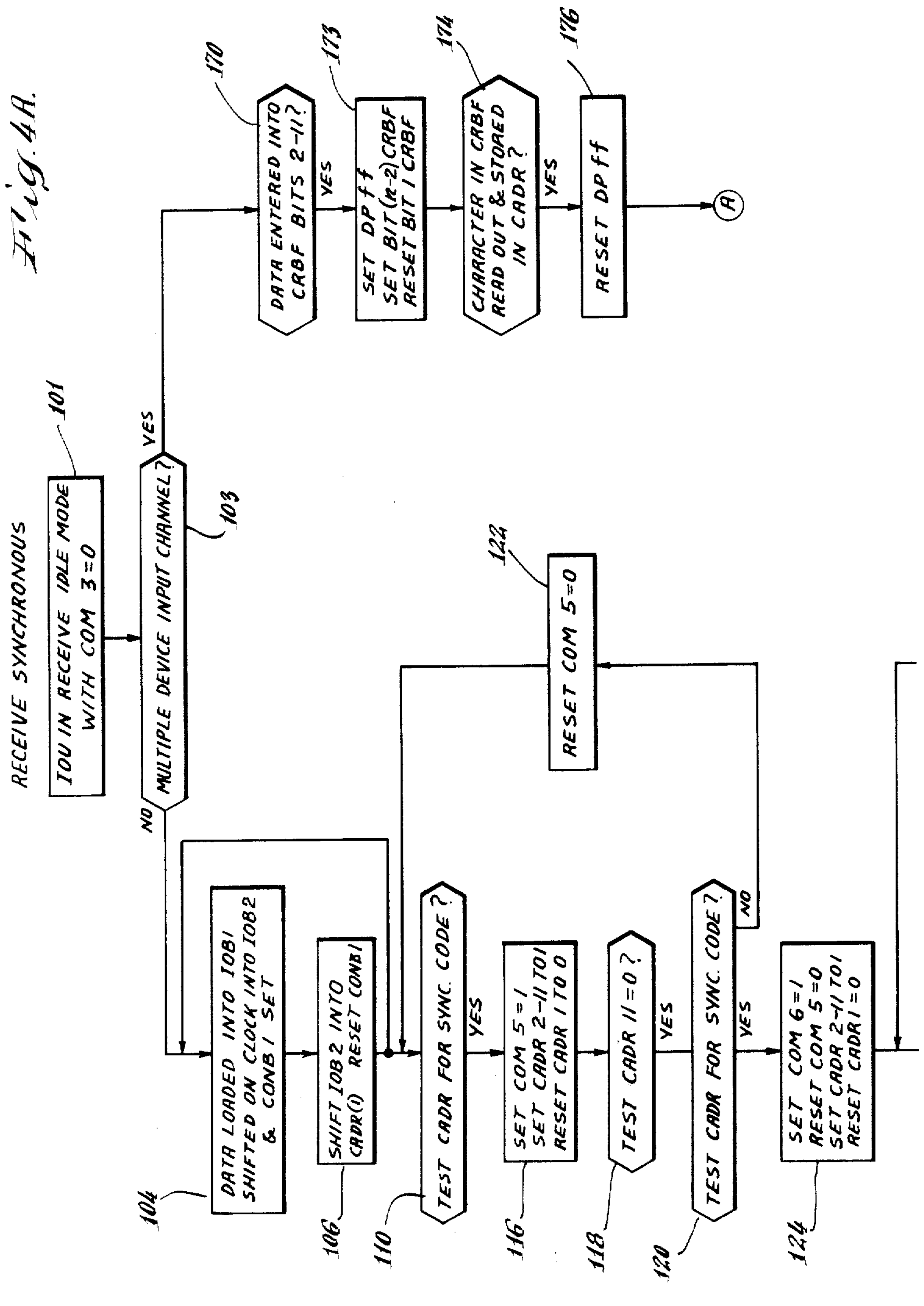
FIGS. 4A – 4B, when combined, form a flow diagram of the operation of the system shown in FIGS. 2A – 2C when receiving synchronous data.
Figure 4B:
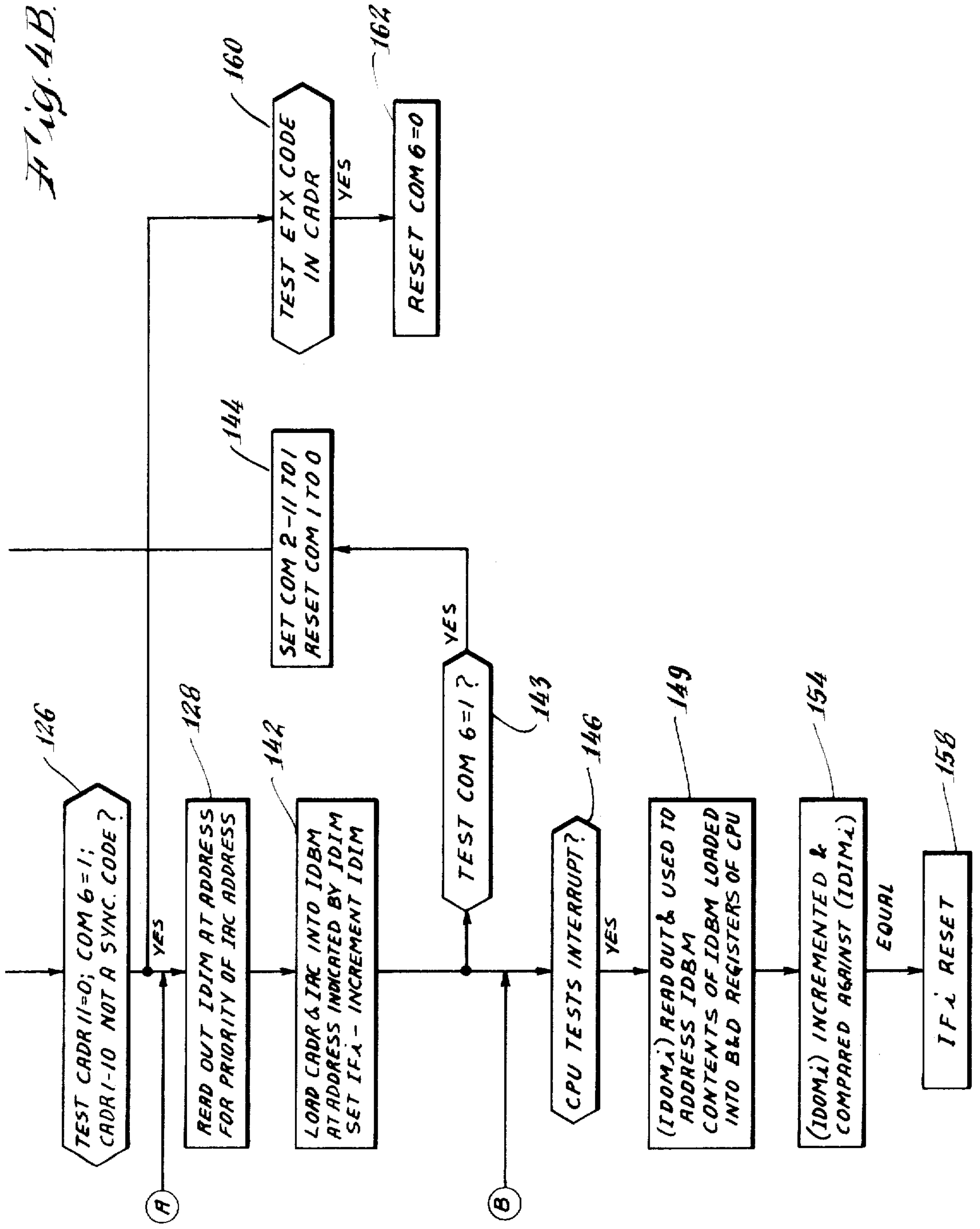

FIGS. 4A – 4B form a functional flow diagram of the manner in which the system operates to receive data from a synchronous channel. Referring now to FIG. 4A, it is seen that for the particular channel, the IOU is in the receive idle mode with all bits of the COM word for the channel, including COM 3, set to zero (step 101). Assume initially, that step 103 indicates the channel being served as containing only a single device. The channel might thus, for example, be the high speed line 18 connected to processor 16. Under these conditions, data is being received at interface 20 with each new bit being loaded into position IOB1 of the interface buffer 105 (FIG. 2A). At each synchronous clock of interface 20 a bit stored in IOB1 is shifted into position IOB2 of the buffer and flip-flop COMB 1 of the interface is set (step 104). The condition of COMB 1 is monitored through IOSC 50 and line 107 by IOCL 98. Each time that IAC 52 is pointing to the particular channel, and it is detected that COMB1 for the channel is set, IOCL generates a command causing the bit in IOB2 to be transferred through IOSC 50 and shifted into the left most position of CADR 56 (this position being hereinafter referred to as CADR-1). When IOB2 is empty, COMB-1 is reset on the next synchronous interface clock. The operations shown in block 106 of FIG. 4 are in this manner effected. As indicated previously, the contents of CADR are shifted into the appropriate memory position of CADM at the end of each clock time of IAC 52.

The shifting of bits into CADR 56 is a continuous operation which is repeated each time a new bit is loaded into IOB1. A sync code decoder in CADR detectors (CRD) 108 is continuously monitoring the contents of CADR to determine if a sync code is stored therein (step 110). So long as no sync code is detected, the bits continuously shift through CADR 56. When a sync code is detected in CADR 56, CRD 108 applies a signal through line 112 to IOCL 98 to cause the control word stored in register 92 to be altered by setting bit number five (COM-5) to one. IOCL 98 also applies signals through lines 114 to set bits 2-11 of CADR to one and to reset bit 1 of CADR to zero (step 116). The loading of CADR in this way permits the detection of a new character in CADR to be easily effected. Since a new character is shifted into CADR a bit at a time, bit 11 of CADR will remain set to one until a full ten-bit character has been shifted into CADR at which time a zero will be shifted into this position. A full character in the CADR may thus be detected by monitoring bit 11 of CADR for zero. At the end of the IAC clock, the contents of CADR and COMR are loaded into appropriate memory positions of CADM and COM respectively to preserve the settings of these registers until the IAC again indicates the address of a particular channel.

As indicated by step 118 of FIG. 4, bit 11 of CADR is continuously tested in CRD 108 for a zero bit in the bit 11 position. From previous discussions, will be remembered that the detection of this condition means that a new full character is in CADR. This character is then tested to determine if it contains the sync code (step 120). Since sync is established only if two or more successive sync characters are received, if the second character is not a sync character, bit 5 of COM is reset (step 122) and the system returns to step 110 testing for the sync code. If the second character is a sync code, then sync is established. This condition is stored in the system by setting COM 6 to its one state and resetting COM 5 to its zero state. This effectively converts the system from the receive idle to the receive active or receive mode. As may be seen from step 124, IOCL also resets CADR-1 to zero and CADR 2-11 to one at this time. The reason for this is to permit the detection of the next full character in CADR in the manner previously described.

Since steps 104 and 106 are continuously being performed new characters are continuously being shifted into CADR from the selected channel. Each time that the channel address appears in IAC, CADR 11 is tested for zero. When the CADR 11 equals zero condition is detected, CRD also checks to determine if the character is not a snyc character (step 126) (FIG. 4B). If the character is not a sync character, then the system branches to step 128 to start loading the character into the system. The first step in this operation is to generate an output on line 130 from PLD 66 indicating the priority level of the channel having the address contained in IAC 52. The signal on line 130 is utilized to address IDIM 64 causing the address in IDBM at which the new character is to be stored to be read out and temporarily stored in pointer-data-in buffer PDIB 132. The contents of buffer 132 are incremented in circuit 134 and restored in the appropriate priority position of memory 64. The address in buffer 132 is also applied through OR gate 136 and line 138 to the address input of IDBM 62 causing the character in CADR 56 which is applied through OR gate 60 and line 140 to be stored in IDBM 62. The IAC address on line 129, indicating the channel for the received character is stored with the character in memory 62. The reason for storing the address with the character is that several channels may have the same priority level and no means is provided in IDBM for distinguishing between these channels.

The priority level on line 130 is also applied to interrupt flop control (IFC) 68 to cause the interrupt flip flop 70 for the indicated priority level to be set. The operations required by step 142 are thus completed. The system then tests to be sure COM 6 is still equal to one (step 143). If it is, CADR 2-11 are set to one and CADR 1 is set to zero (step 144) thus setting the register for the detection of the next complete character therein. The system then returns to step 126 to cause a new received character to be recognized and loaded into an appropriate position of IDBM.

CPU 10 periodically tests interrupt (step 146). When, during a test interrupt, it is found that one of the IFi flip flops 70 is set, the CPU generates an input-output command (IOC) which is decoded in IOC decoder 74 causing a signal to be applied through line 148 to POD 76. POD 76, in response to a signal on line 148, generates an output on a line corresponding to the highest priority flip flop 70 which is set, this signal causing the position in IDIM and IDOM for the indicated priority level to be read out. The address from IDOM is applied directly through OR gate 136 to cause the contents of the address position in IDBM to be read out with the data portion of the contents of this address being stored in B register 80 and the address portion of this word being stored in D register 82 (step 149). The address read out of IDIM is temporarily stored in buffer 132 and is thus ineffective at this time. The output from IDOM is also incremented in circuit 150. The incremented address is restored in IDOM and is also applied as one input to compare circuit 152, the other input to this circuit being the output from IDIM (step 154). If necessary, the output from IDIM may be delayed slightly before being applied to compare circuit 152 to compensate for any delay in incrementing circuit 150. If the compared values are not equal, IFi 70 remains set and any additional stored character for this priority level is read out the next time the computer tests interrupt. If the compared values are equal, there are no further characters waiting to be read out at the given priority level, and a signal is applied through line 156 to IFC 68 to cause the flip flop 70 for the particular priority level to be reset (step 158). It should be noted that if the incrementing of IDIM or IDOM at any time causes the address pointer to move to an address outside the area assigned to the particular priority level in IDBM 62, this is detected by initial and final address control (IFAC) circuit 159. When this occurs, circuit 159 resets the address indication to the first address in IDBM for the priority level.

The loading of new characters from the synchronous channel into CADR, the transferring of these characters into IDBM, and the final transfer of these characters into the CPU continues in the manner indicated above until, during step 126, when a full character is detected in CADR, the end of text (ETX) code is found by detectors 108 in this register (step 160). When this occurs, IOCL causes COM 6 for the select channel to be reset, returning the IOU to the receive idle mode for the given channel (step 162). The ETX character is however treated the same as any other character and is processed through steps 128, 142, 146, 149, 154 and 158.

RECEIVE ON MULTIPLE DEVICE SYNCHRONOUS INPUT CHANNEL

For the embodiment of the invention shown in FIGS. 2A – 2C it is assumed that eight keyboards are tied together to make up an input channel. The portion of interface 34 shown in FIG. 2A appears for each of the eight keyboards. It should be noted that unlike the channel described above on which information is received on a bit by bit basis, the information from the depression of a key on a keyboard is received in parallel.

When scanning the multiple device channel, keyboard scan counter (KBSC) 166 replaces the three least significant bits of IAC 52. Referring now to FIG. 4A, it is seen that a character is loaded into interface 34 by storing its characters in bits 2–11 (assuming 10-bit character) of character buffer register (CRBF) 168 (step 170). The loading of the character into CRBF is under control of a strobe signal synchronized with the addressing of the keyboard by KBSC 166. When a character is loaded into CRBF, data present (DP) flip flop 172 is set, bit (N + 2) (bit 12 for the example chosen) in CRBF is set, and bit one in CRBF is reset (step 173). The setting of bit 12 is for the detection of an end of character at CRBF while the resetting of bit one is used to detect that a full character is in CADR (i.e. bit 11 equals zero). The character in CRBF 168 is then shifted out a bit at a time into CADR 56 during successive accesses to the channel (step 174). When it is detected that the complete character in CRBF has been read out (CRBF all zeros), DP flop 172 is reset (step 176). At the same time, a full character is detected in CADR, (bit 11 is detected as being equal to zero). When this occurs, the circuit branches to step 128 and proceeds with the succeeding steps to store the character in IDBM and to transfer the character into the CPU. However, since there is no testing for sync when operating with multiple devices, COM 6 is not utilized and steps 143, 160 and 162 are not required.

RECEIVED DATA FROM AN ASYNCHRONOUS CHANNEL

Figure 5:
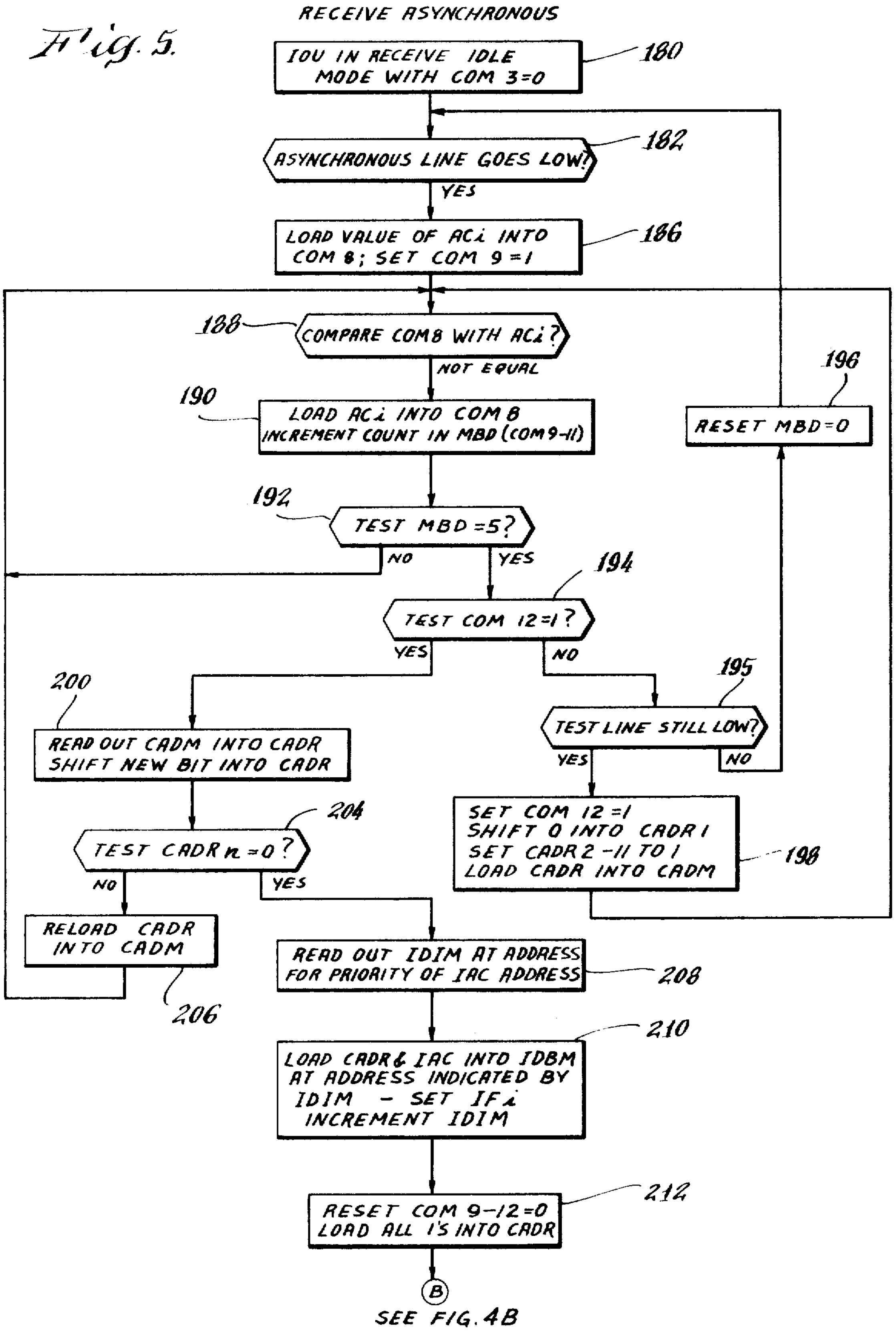
FIG. 5 is a flow diagram of the operation of the system shown in FIGS. 2A – 2C when receiving asynchronous data.

The reception of data from an asynchronous channel differs from the reception of data on a synchronous channel in that clocking for the receive operation must be supplied by the IOU. FIG. 5 is a functional flow diagram of the operations performed in receiving data from an asynchronous line. Referring to FIG. 5 it is seen that, as with the synchronous channel, the IOU is initially in the receive idle mode for the channel with all bits of its control word, including bit 3 reset to zero. When the communications line goes low, indicating that data is present (step 182), and IAC 52 gets to the address of the channel, the value of the asynchronous clock (AC) 184 associated with the channel is loaded into COM 8 and COM 9 is set to one (step 186). There is an asynchronous clock for each different speed channel serviced by the IOU with the frequency of the asynchronous clock being four times higher than the asynchronous frequency of the channel. There are thus eight transitions in the asynchronous clock for each bit time of the channel. When the line goes low, this may be caused by the space bit at the beginning of a character, or it may be caused by a noise signal. The first step in the operation is to determine if the change is in fact the beginning of a character.

To accomplish this, it is assumed that if the space pulse lasts for at least half a clock time then it is a true space pulse. The circuit thus counts five asynchronous clock transitions and tests to determine if the line is still low. To do this, each time IAC addresses the channel, the value in COM 8 is compared with the setting of the appropriate AC clock 184 (step 188). When these compared values are not equal, this means that an ACi clock transition has occurred. When this happens, the new value of ACi is loaded into COM 8 by IOCL 98 and the count in midpoint detector counter (MBD), which is formed by bits 9–11 of COM for the given channel, is incremented (step 190). After each incrementing the count in MBD is tested. When this test finds that MBD is equal 5 (step 192) and at the same time it is found that COM 12 is not equal one (step 194) the circuit tests to determine if the input channel is still low (step 195). If the line is not still low this means that the initial input was not a true space pulse and that a character is not in fact being applied to the line. Under these conditions MBD is reset to zero (step 196) and the system returns to step 182 looking for a space bit.

If the line is found to be low during step 195 this means that a character is now being applied to the line. This is indicated by setting COM 12 to 1 for the given channel. For reasons which have been indicated previously, CADR 1 is set to zero at this time and CADR 2–11 are set to one (step 198). The contents of CADR are then loaded into CADM.

The circuit then returns to step 188 incrementing the count in the MBD counter each time a transition of the asynchronous clock is detected. MBD counts to seven and then resets to one. Thus, the next time that the count in MBD is equal to five, the midpoint of the first data bit of the input should be on the channel. Thus, when during step 194, COM 12 is tested and found equal to one, the system branches to step 200. From FIG. 5, it is seen that this involves the reading out of CADM into CADR and the shifting of the new bit from IOB2 202 of the asynchronous channel interface 28 into CADR 56. After the loading of the new bit into CADR, CADR 11 (assuming 10-bit characters) is tested for Zero (step 204). If this test indicates that the bit is not zero, the contents of CADR are reloaded into CADM (step 206) and the system returns to step 188 to find the midpoint of the next received bit and load it into the system.

When the last bit of a character has been loaded into CADR, the test of step 204 yields a positive result causing the system to branch to step 208. During step 208 the input address in IDIM for the priority level indicated by PLD is accessed and during step 210 this address is utilized in a manner previously indicated to load the received character in CADR and the channel address in IAC 52 into IDBM 62. Also during step 210, the appropriate interrupt flip flop 70 is set and the address for the given priority level in IDIM incremented both in manners previously described. The circuit is then prepared for the receipt of a new character by restoring it to the receive idle mode. This is accomplished by resetting COM 9–12 to zero. In order to prevent a spurious character from being loaded into IDBM all ones are set into CADR (step 212).

The character stored in IDBM is read out into the CPU in a manner identical to that previously described in connection with the reception of synchronous data. This involves the performance of step 146, 149, 154 and 158 shown in FIG. 4. The operations involved in performing these steps will not be repeated at this point.

TRANSMIT

The transmit operation is substantially identical for both synchronous and asynchronous lines and these operations will thus both be treated in the same section. The system is shifted into transmit mode by an IOC issued by the CPU. This IOC is decoded in decoder 74 and applied to IOCL 78 to cause COM 4 at the address indicated by D register 82 to be set equal to one (step 220). If the system is to be operating in transmit passive rather than transmit active mode, COM 7 is also set equal to one at this time.

The next time that the channel address appears in IAC 52, the marked COM 4 bit is detected (step 222). The RTS flip flop 224 or 226 in the channel interface is set (step 228). Since there is generally a delay of about twenty microseconds, from the time that the RTS flip flop is set until the time that data can actually be transmitted, a timer may be provided in the IOU which delays further operations for approximately this time duration. At the end of this time duration, when IAC again indicates the address of the particular channel, COM 3 is set by the IOCL indicating that the IOU is in transmit mode for the given channel (step 230).

The circuit then tests to see if COM 2 is reset (step 232). From FIG. 3 it is seen that COM 2 being set indicates that ODBM 84 does not contain data to be transmitted and is thus in condition to receive a character from the CPU. Under these conditions, the IOCL generates a signal on line 234 which is applied through OR gate 236 and line 238 to cause the running of the IAC to be temporarily halted (step 240). The IDIM is then read out under control of the PLD in the manner previously indicated (step 242), and a request-for-character signal is generated by the IOCL and applied through line 244 OR gate 60 and line 140 to be stored in IDBM 62 (step 246). As before, the IAC address is stored with this signal in the IDBM. The priority flip flop 70 corresponding to the indicated channel is set and the address in IDIM incremented both in the manner previously indicated (step 250) and the hold on the IAC release (step 252).

When the CPU tests interrupts (step 254) and finds that the device in question has a message to send (it should be noted that several other interrupts may have been processed in the interim) it causes the contents of IDBM at the address determined by IDOM to be read out into the B and D registers, 80 and 82 respectively, in a manner previously described (step 256). Likewise, the IDOM is incremented, compared against the IDIM, (step 258) and the IFi reset if they are equal (step 260) all in the manner previously described.

The effect of the above described sequence of operations is to inform the CPU that the ODBM is available to receive a character to be transmitted to the channel which the CPU has indicated it wishes to transmit to. Performing the operation in this manner eliminates the necessity of the CPU continuously monitoring the state of the ODBM.

When the CPU receives the message, it loads the character to be transmitted into B register 80 and the channel address for the character into D register 82. The CPU then issues an I/O command on line 73 which is decoded by decoder 74 to cause the character stored in B register 80 to be loaded into ODBM 84 at the address given by the D register. During the loading of ODBM (step 262) the issued IOC is effective to cause a hold signal to the IAC to appear on line 238. This hold is released when the loading of the ODBM is completed.

When the ODBM is loaded, COM 2 for the selected device is set and COM 4 reset (step 264). These operations would normally be performed in response to an IOC from the CPU but may also be performed under control of IOCL 98. These operations indicate to the system that the ODBM has a character to be transmitted.

The next step in the operation is to determine if CADR for the given device also contains a character to be transmitted. If CADR does not contain a character to be transmitted, then the character in ODBM is transferred to CADR for transmission. The above operations are accomplished by testing COM 1 to determine if it is reset (step 266). If this bit is reset, then, the next time IAC addresses the given channel, the contents of ODBM 84 rather than the contents of CADM 54 are read out into CADR 56 (step 268).

At this point the operation varies depending on whether it is a synchronous or an asynchronous channel to which transmission is being sent. Assume initially that transmission is to a synchronous channel. Under this condition the system branches from step 270 to step 272. During this step bit 11 of CADR is set to one. As will be seen later, this is utilized to detect that the entire character has been transmitted. In addition, COM 1 for the given channel is set, indicating that CADM now contains a character to be transmitted and COM 2 is reset indicating that the ODBM does not contain data to be transmitted. Finally COM 4 is set (step 274). At this point in the operation, if the unit is operating in the transmit active mode for the channel (step 276), the unit returns to step 232 to start the loading of a new character to be transmitted into ODBM 84. If bit 7 is marked, indicating that the unit is in the transmit passive mode, this request for a new character is not generated.

Figure 6A:
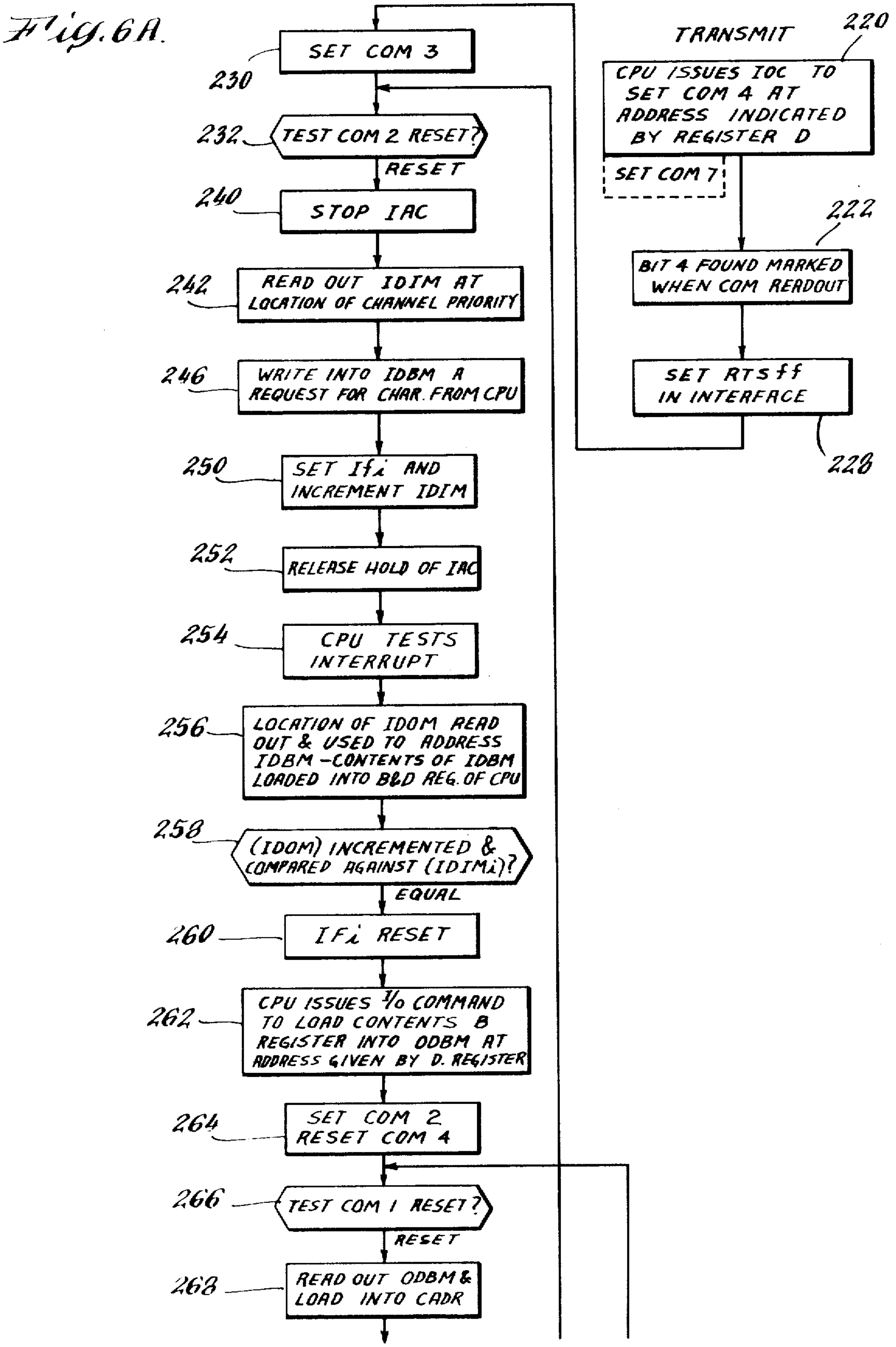
FIGS. 6A – 6B, when combined, form a flow diagram of the operation of the system shown in FIGS. 2A – 2C when transmitting data.
Figure 6B:
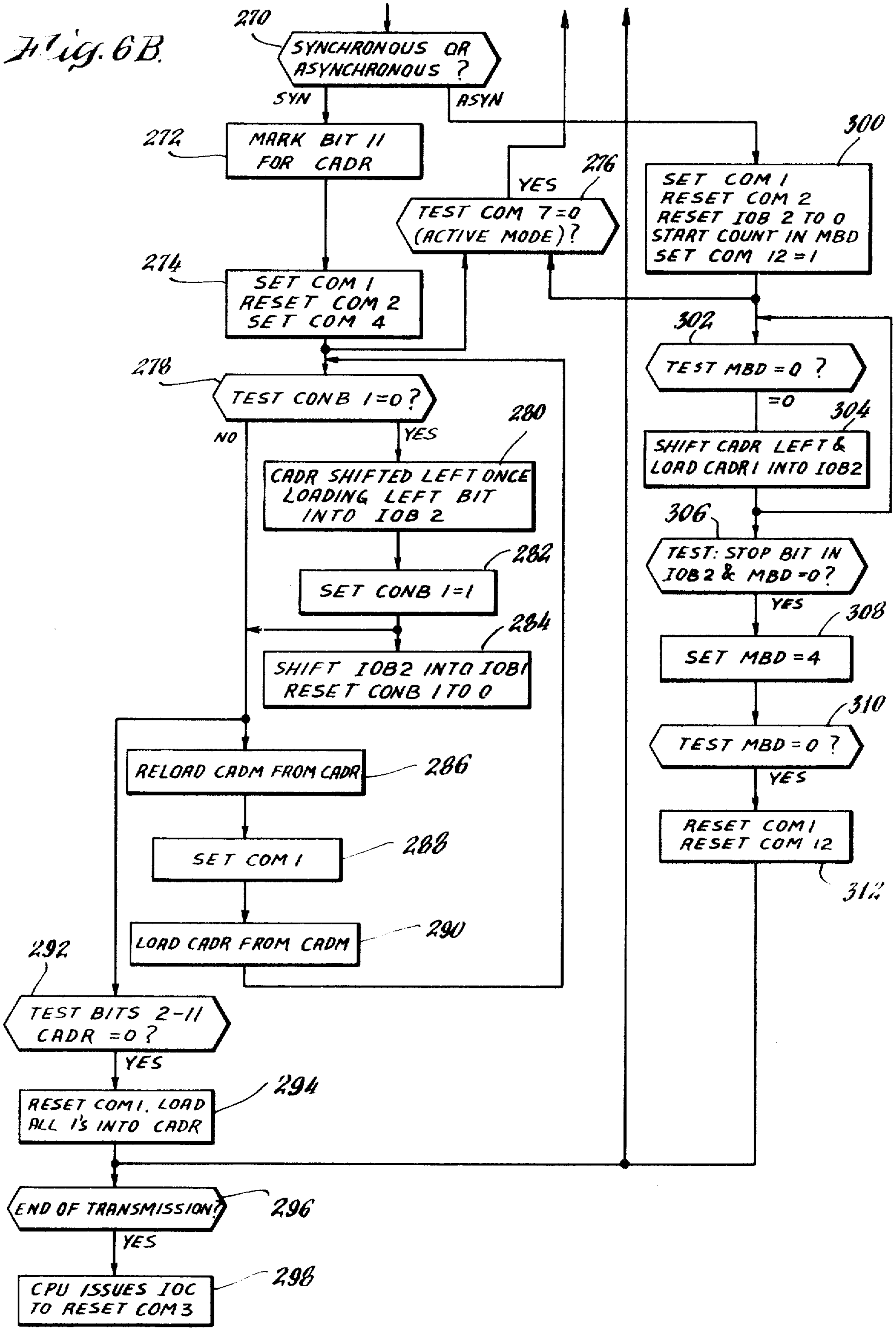

At the same time that this request for a new character is being made, and regardless of whether the system is in the transmit active or the transmit passive mode, the unit branches to step 278 during which CONB 1 in the interface is tested to determine if it is equal to zero. If CONB 1 equals zero, then IOB2 is empty and the interface is available to receive a character. If CONB 1 equals 1, there is a bit in the buffer and a new bit may therefore not be transferred into it. Under these conditions, as may be seen from FIG. 6B, the loading steps to now be described are bypassed and the contents of CADR loaded into CADM (step 286).

If CONB 1 is equal to zero, the unit branches to step 280 during which CADR is shifted left once, loading its left-most bit (CADR 1) into IOB2. During step 282, CONB1 is set equal to 1 indicating that there is now a bit in its buffer. At some later time, this may be several IAC clock cycles later, the contents of IOB2 are shifted into IOB1 from which they are applied to the channel and CONB1 is set to zero (step 284).

In the mean time, the character in CADR is loaded into CADM at the addressed memory position (step 286) and bit COM 1 is set to indicate that CADM now contains data to be transmitted (step 288).

The next time that IAC 52 addresses the channel, the word to be transmitted or portion thereof, now stored in CADM is reloaded into CADR (step 290) and the unit returns to step 278 to determine if the interface is ready to receive another bit. Steps 278–290 are cyclically repeated as many times as are necessary in order to read out the character to be transmitted to the interface. It is noted that after each performance of step 282, bits 2–11 of CADR are tested to determine if they are all zero (step 292). Since CADR 11 was marked during step 272, bits CADR 2–11 cannot be equal to zero until the entire character has been shifted out of CADR. Thus, step 292 yields a positive result only when the character to be transmitted has been completely transferred to interface 20 and CADM is ready to receive a new character. Under these conditions, the IOCL resets COM 1 and loads all ones into CADR to prevent a spurious end-of-character indication from being generated (step 294). It should be noted that while steps 286 and 290 continue to be performed each time IAC addresses the channel, the performance of step 288 is suppressed.

With COM 1 reset, the system returns to step 266, assuming that the system is in the active mode, to read out the character which is now in ODBM into CADR and to cause this character to be transferred from CADR and CADM into interface 20.

Transmission of characters in the manner indicated above continues until, after the loading of a character into the IOC, the CPU makes an end-of-transmission determination (step 296). When this happens, the CPU issues an IOC which is decoded by decoder 74 to cause COM 3 to be reset (step 298) causing the system to return to the receive mode.

If, during step 270, it is determined that the channel to which transmission is being made is an asynchronous rather than a synchronous channel, the unit branches to step 300. During step 300 COM 1 is set to one, COM 2 is reset to zero, the IOB2 buffer 202 in interface 28 is reset to zero, COM 12 is set to 1, and the count is started in midpoint detector (MPD) counter. This later step is accomplished by setting the value of asynchronous clock 184 into bit 8 and by setting bit 9 equals 1. Each time that the value of bit 8 and the asynchronous clock are not equal, bit 8 is set to the value of the asynchronous clock and the count in MBD (COM 9–COM 11) is incremented.

At the same time that step 300 is being performed, the system tests (step 276) to determine if it is in the transmit active mode and, if the system is in the transmit active mode for the given channel, returns to step 232 to load a new character into ODBM in the manner previously indicated.

The count in MBD is incremented in the manner indicated above and the value of the count monitored. When this count equals zero (step 302), CADR is shifted left with CADR 1 being loaded into IOB2 (step 304). The system then returns to step 302 incrementing the MBD and testing its value for zero. This sequence of operations is repeated until all bits of the character in CADM are loaded into IOB2 and the stop bit is loaded into IOB2 as well. When the stop bit is in IOB2 and MBD equals zero (step 306), MBD is set equal to four (step 308). One half clock cycle later when MBD is again equal to zero (step 310), COM 1 and COM 12 are both reset to zero (step 312). The unit then branches either to step 266 to cause a new character from ODBM to be loaded into CADR for transmission to the channel or to step 296 to end the transmission.

ALTERNATIVE EMBODIMENT

Figure 7:
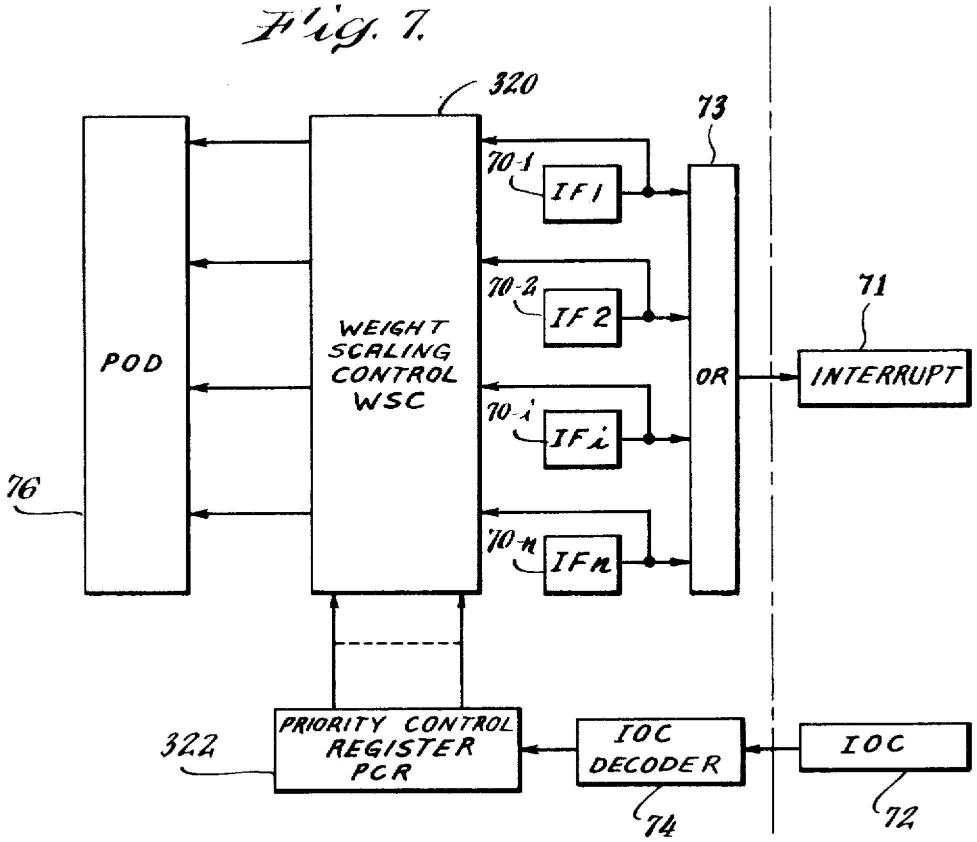
FIG. 7 is a schematic block diagram of a portion of the circuit shown in FIG. 2C for an alternative embodiment of the invention.

In the embodiment of the invention shown in FIGS. 2A–2C, the priority assignments for the various channels is fixed and may be altered only by rewiring the IOU. FIG. 7 shows an alternative embodiment of the invention in which the CPU has the capacity to assign or change the priority levels for the various channels thus permitting greater flexibility in the operation of the system. This is accomplished by connecting the output lines from each of the flip flops 70 to POD 76 through a weight scale control circuit (WSC) 320. This circuit is effective to change the weight assigned to each of the flops 70 in accordance with the word stored in priority control register (PCR) 322. PCR 322 is loaded by an IOC from the CPU. Thus, if 64 different priority sequences were possible, PCR 322 would be an eight bit register. The code contained in the PCR is decoded in WSC 320 and utilized to gate the IFi output which is to be passed to POD 76.

Another possible way in which some flexibility may be provided over channel priority assignments is to provide one or more unused priority levels. In the event that the CPU needs an immediate response from an I/O device or other channel element, this level is assigned to the channel and given the highest priority. Where immediate responses are desired, this method has the advantage that all outstanding interrupts for channels of the same priority do not have to be served before the desired access can be granted.

It is apparent that means equivalent to those described above might be utilized for performing some of the functions such as end-of-character detection and the like and that some of the functions indicated as being performed by hardware may be performed by software and visa versa. Thus, while the invention has been particularly shown and described with reference to preferred embodiments thereof, it will be understood by those skilled in the art that the foregoing and other changes in form and details may be made therein without departing from the spirit and scope of the invention.

What is claimed is:

1. A unit for controlling the transfer of information between a plurality of data bearing lines, which lines are scanned in a predetermined sequence, and a central processing unit (CPU), said information having at least two different priority levels, said unit comprising:

means for indicating the data bearing line being scanned at any given time;

means for detecting the priority level of each item of information applied to said unit;

means responsive to said detecting means for informing the CPU of the availability of information at the detected priority level;

an addressable memory, said memory having an area allocated to each of said priority levels;

input means for indicating the address in said memory at which the next item of information at each of said priority levels is to be stored;

means responsive to said detecting and input indicating means for storing each applied item of information in said memory;

output means for indicating the address in said memory at which is stored the next item of information at each of said priority levels to be transferred to said CPU; and means responsive at least in part to said informing means and said output means for transferring an item of information from said memory to said CPU.

2. A unit of the type described in claim 1 wherein said informing means includes at least one element for each priority level;

wherein the priority represented by each element of said informing means may be varied; and including means for indicating the priority level represented by each element of said informing means; and means responsive to the last mentioned indicating means for controlling the address in the output means utilized for each transfer of information from said memory to said CPU.

3. A unit of the type described in claim 2 including means for permitting said controlling means to be controlled from the CPU.

4. A unit of the type described in claim 1 wherein said means for storing information in said memory stores information in said memory a character at a time; and including means for assembling bits received on said data bearing lines into characters.

5. A unit of the type described in claim 4 wherein said character assembling means includes a memory having a storage position for each of said lines, a register in which each received bit is stored, and a means operative each time said indicating means indicates a given line for transferring a partially assembled character from the position for the line in said memory to said register and for restoring the contents of said register to the position in said memory when said indicating means is ready to pass on to the next line.

6. A unit of the type described in claim 5 including means for detecting when a full character has been assembled in said register; and wherein said means for storing information in said memory includes means operative in response to said full-character detecting means for transferring the contents of said register into said memory.

7. A unit of the type described in claim 6 wherein at least one of said data bearing lines is a synchronous line; and including means for detecting a sync code in said register; and means responsive to said sync code detecting means for activating said full character detection means.

8. A unit of the type described in claim 4 wherein at least one of said lines is an asynchronous line; and including means for generating a clock which is related to the clock rate of said asynchronous line;

means operative when a pre-determined change occurs in the condition of said asynchronous line for determining if a character is present on the line; and means responsive to said determining means for initiating the operation of said means for assembling bits into characters.

9. A unit of the type described in claim 5 including output buffer memory means having at least one position for each of said lines;

means responsive to an instruction from said central processing unit for loading a character to be transmitted on a given line into a position corresponding to the line in said output buffer memory means; and wherein said means for assembling bits into characters includes character disassembly means for transmitting said character on said given line a bit at a time.

10. A unit of the type described in claim 9 wherein said character disassembly means includes a memory having a character position for each of said lines, a register, means for transferring a character to be transmitted from said output buffer memory means to the corresponding position in said disassembly means memory, means operative each time said line indicating means indicates the line for transferring the character from the disassembly means memory to the disassembly means register, and means operative when the character is in said disassembly means register and said line is available to receive a bit for transferring a bit from the disassembly means register to said line.

11. A unit of the type described in claim 1 including an interface device for at least one of said lines, said interface device having a means for assembling a character; and means operative when a character has been assembled in said interface device for transferring the character to said unit.

12. A unit of the type described in claim 11 wherein there may be a plurality of lines serviced by said interface device; and wherein said data bearing line indicating means includes means for indicating the particular one of said plurality of lines serviced by said interface device.

13. A unit of the type described in claim 1 wherein said information storing means includes means for storing an indication of the data bearing line being scanned with said information.

14. A unit of the type described in claim 4 including memory means for storing a control word for each of said lines;

register means for storing the control word for a line each time the line is scanned; and means responsive to the control word stored in said register means for controlling the character assembly and other operations of said unit.

15. A unit of the type described in claim 14 including means for altering the control word in said register means in response to controlling means or said CPU, said unit.

16. An interface unit for a CPU, said unit comprising:

means for scanning a plurality of lines;

means for indicating the line being scanned at any given time;

means operative when a bit is detected on a scanned line for storing the bit;
means for assembling the stored bits for each line into characters;
means operative when a complete character has been assembled for a given line for indicating a priority level for the line;
a memory having an area for each priority level;
first means responsive to said priority level indicating means for storing the complete character in said memory in the area for the indicated priority level;
second means responsive to said priority level indicating means for indicating to the CPU that the unit has a character at the indicated priority level, the CPU being adapted to generate a request for a character; and
means responsive to a request for a character from the CPU for transferring to the CPU a character from the highest priority area of said memory having a character to transmit.

17. A unit of the type described in claim 16 including means operative when a character is transferred to said CPU for determining if there are any additional characters to be transmitted from said highest priority area of memory; and
means responsive to a determination that there are no further characters to be transmitted in said highest priority area for resetting the priority level indicating means for the priority level from which characters were transmitted.

18. A unit of the type described in claim 16 wherein said memory is an addressable memory;
and wherein said means for storing the character in said memory includes means for indicating the address in said memory, for each of said priority levels, at which the next character is to be stored.

19. A unit of the type described in claim 16 wherein said memory is an addressable memory;
and wherein said means for transferring a character to the CPU includes means for indicating, for each priority level, the address from which the next character is to be transferred.

* * * * *